United States Patent
Xu et al.

(10) Patent No.: US 9,462,631 B2
(45) Date of Patent: Oct. 4, 2016

(54) WIRELESS SENSOR NETWORK, METHOD AND SYSTEM FOR ADJUSTING BEHAVIORS OF WIRELESS SENSOR NODES IN WIRELESS SENSOR NETWORK

(71) Applicant: Tsinghua University, Beijing (CN)

(72) Inventors: Ke Xu, Beijing (CN); Yi Qu, Beijing (CN); Wenlong Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 223 days.

(21) Appl. No.: 14/469,701

(22) Filed: Aug. 27, 2014

(65) Prior Publication Data

US 2015/0103694 A1  Apr. 16, 2015

(30) Foreign Application Priority Data

Sep. 13, 2013  (CN) .......................... 2013 1 0418150

(51) Int. Cl.
*H04W 52/02* (2009.01)
*H04W 84/18* (2009.01)

(52) U.S. Cl.
CPC ......... *H04W 84/18* (2013.01); *H04W 52/0216* (2013.01); *H04W 52/0219* (2013.01); *Y02B 60/50* (2013.01)

(58) Field of Classification Search
CPC ................... H04W 52/0219; H04W 52/0216; H04W 56/00; H04W 16/14; H04W 74/00; H04W 84/18; H04W 72/02; H04W 74/04; H04L 67/12; H04L 67/04; Y02B 60/50
See application file for complete search history.

(56) References Cited

U.S. PATENT DOCUMENTS

| | | | | |
|---|---|---|---|---|
| 2003/0152041 A1* | 8/2003 | Herrmann | ............... | H04L 12/12 370/310 |
| 2004/0100917 A1* | 5/2004 | Perkins | .................. | H04W 84/20 370/311 |
| 2008/0084304 A1* | 4/2008 | Yarvis | ................ | G06K 17/0022 340/572.1 |
| 2008/0253327 A1* | 10/2008 | Kohvakka | ............. | H04W 16/14 370/330 |
| 2008/0259919 A1* | 10/2008 | Monga | ..................... | H04L 43/12 370/389 |
| 2013/0128786 A1* | 5/2013 | Sultan | ............... | H04W 52/0238 370/311 |

FOREIGN PATENT DOCUMENTS

CN  101489275 A  *  7/2009
FI  WO 2006067271 A1  *  6/2006  ............ H04W 16/14

* cited by examiner

*Primary Examiner* — Redentor Pasia
*Assistant Examiner* — Peter Mak
(74) *Attorney, Agent, or Firm* — Kile Park Reed & Houtteman PLLC

(57) ABSTRACT

A method and a system for adjusting behaviors of wireless sensor nodes in a wireless sensor network, and a wireless sensor network are provided. The method comprises: initializing wireless sensor nodes in the wireless sensor network, in which each of a node role queue and a high energy device queue of the node is initialized to be empty; for a high energy device in the wireless sensor network, computing a node role of each surrounding wireless sensor node, broadcasting a message including the node role of each surrounding wireless sensor node and an identifier of the high energy device; for each wireless sensor node, receiving the message broadcast by the high energy device, updating the node role queue and the high energy device queue according to the message, and adjusting a behavior thereof according to the updated node role queue.

18 Claims, 4 Drawing Sheets

WIRELESS SENSOR NETWORK, METHOD AND SYSTEM FOR ADJUSTING BEHAVIORS OF WIRELESS SENSOR NODES IN WIRELESS SENSOR NETWORK

CROSS-REFERENCE TO RELATED APPLICATION

This application claims priority to and benefits of Chinese Patent Application Serial No. 201310418150.X, filed with the State Intellectual Property Office of P. R. China on Sep. 13, 2013, the entire content of which is incorporated herein by reference.

FIELD

The present disclosure relates to a wireless communication field, and more particularly to a wireless sensor network, and a method and a system for adjusting behaviors of wireless sensor nodes in the wireless sensor network.

BACKGROUND

The wireless sensor network consists of many wireless sensor nodes in a particular area. These wireless sensor nodes can sense their surroundings or monitor particular events, and have wireless communication ability. After sampling sensor information, the wireless sensor nodes transmit the sensor information to a data gathering node in a single hop way or in a multi-hop way. The data gathering node can store the sensor information for local use or upload the sensor information to other internet networks. Since the end of $20^{th}$ century, the wireless sensor network has been improved rapidly and applied in many fields such as military affairs, transportation and environment monitoring, which greatly affects people's living and working.

With the development of the wireless sensor network, it faces a lot of practical problems, the most serious one of which is the limited energy of the wireless sensor nodes. Such a problem is caused by following factors: 1) the wireless sensor node is generally powered by a battery which has limited energy; 2) the wireless sensor nodes are generally disposed in areas which is difficult for human to reach, and thus it is difficult to replace batteries; 3) the number of wireless sensor nodes in the wireless sensor network is large, and thus it wastes lots of manpower to replace the batteries.

The high energy devices such as laptops and mobile phones have more abundant energy than the wireless sensor nodes. When the wireless sensor nodes and the high energy devices exist in the same area, it is possible for the high energy devices to participate in the wireless sensor network, to coordinate interactive operations between the wireless sensor nodes, and to assist the wireless sensor network, thus saving energy. However, in real cases, there are always many high energy devices in one area, and when all the high energy devices coordinate the interactive operations between the wireless sensor nodes simultaneously, the wireless sensor nodes may suffer from behavioral disorders, thus breaking down the wireless sensor network.

SUMMARY

Embodiments of the present disclosure seek to solve at least one of the problems existing in the related art to at least some extent.

According to a first aspect of the present disclosure, a method for adjusting behaviors of wireless sensor nodes in a wireless sensor network is provided. The method comprises: A) initializing wireless sensor nodes in the wireless sensor network, in which each of the wireless sensor nodes has a node role queue and a high energy device role queue, and each of the node role queue and the high energy device queue is defined to have no more than two elements and initialized to be empty; B) for a high energy device in the wireless sensor network, computing a node role of each surrounding wireless sensor node, in which the node role is one of a source node, a forwarding node and an affected node; C) for the high energy device, broadcasting a message including the node role of each surrounding wireless sensor node and an identifier of the high energy device; D) for each wireless sensor node, receiving the message broadcast by the high energy device and updating the node role queue and the high energy device queue according to the message; and E) for each wireless sensor node, adjusting a behavior thereof according to the updated node role queue.

In some embodiments, the method further comprises repeating steps BE when a new high energy device appears in the wireless sensor network.

In some embodiments, the method further comprises: when a high energy device quits the wireless sensor network, for each wireless sensor node in the wireless sensor network, clearing the node role defined by the quitting high energy device and the identifier of the quitting high energy device and then executing step E.

In some embodiments, the high energy device determines a wireless sensor node to be a source node when the wireless sensor node is within a communication zone of the high energy device and a next hop node is still within the communication zone of the high energy device; the high energy device determines a wireless sensor node to be a forwarding node when the wireless sensor node is within the communication zone of the high energy device and a next hop node is outside the communication zone of the high energy device; and the high energy device determines a wireless sensor node to be an affected node when the wireless sensor node is outside the communication zone of the high energy device and a next hop node is within the communication zone of the high energy device.

In some embodiments, updating the node role queue and the high energy device queue according to the message broadcast by the high energy device comprises: extracting the node role and the identifier of the high energy device from the message broadcast by the high energy device, adding the node role into the node role queue, and adding the identifier of the high energy device into the high energy device queue, when the high energy device queue is empty or has one element; and discarding the message broadcast by the high energy device when the high energy device queue has two elements.

In some embodiments, when the updated node role queue is empty, the wireless sensor node samples sensor information and transmits the sensor information to a data gathering node via a shortest route or a tree route in a multi-hop wireless transmission way; when the element in the updated node role queue is the source node, the wireless sensor node samples the sensor information and transmits the sensor information to the high energy device; when the element in the updated node role queue is the forwarding node, the wireless sensor node enters a dormancy state periodically, and when the wireless sensor node is working, the high energy device transmits the sensor information sent from the source node to the wireless sensor node and the wireless sensor node transmits the sensor information to a next hop node; when the element in the updated node role queue is the affected node, the wireless sensor node temporarily stores the sensor information when the forwarding node is in the dormancy state and transmits the sensor information to the forwarding node when the forwarding node is working; when the element in the updated node role queue is defined to be the source node by a previous high energy device and then defined to be the source node or the affected node by a subsequent high energy device, the wireless sensor node samples the sensor information and transmits the sensor information to the previous high energy device; when the element in the updated node role queue is defined to be the source node by the previous high energy device and then defined to be the forwarding node by the subsequent high energy device, the wireless sensor node enters the dormancy state periodically, and when the wireless sensor node is working, the wireless sensor node receives the sensor information from the subsequent high energy device and forwards the sensor information to the previous high energy device; when the element in the updated node role queue is defined to be the forwarding node by the previous high energy device and then defined to be the source node by the subsequent high energy device, the wireless sensor node enters the dormancy state periodically, and when the wireless sensor node is working, the wireless sensor node receives the sensor information from the previous high energy device and forwards the sensor information to the subsequent high energy device; when the element in the updated node role queue is defined to be the forwarding node by the previous high energy device and then defined to be the forwarding node or the affected node by the subsequent energy device, the wireless sensor node samples the sensor information and transmits the sensor information to the data gathering node via a shortest route or a tree route in a multi-hop wireless transmission way; when the element in the updated node role queue is defined to be the affected node by the previous high energy device and then defined to be the source node by the subsequent high energy device, the wireless sensor node transmits the sensor information to the subsequent high energy device directly; and when the element in the updated node role queue is defined to be the affected node by the previous high energy device and then defined to be the forwarding node or the affected node by the subsequent high energy device, the wireless sensor node temporarily stores the sensor information when the forwarding node is in the dormancy state and transmits the sensor information to the forwarding node when the forwarding node is working.

The method for adjusting behaviors of wireless sensor nodes in the wireless sensor network according to the present disclosure has advantages of good robustness, high flexibility and better energy saving effect.

According to a second aspect of the present disclosure, a wireless sensor network is provided. The wireless sensor network comprises a plurality of wireless sensor nodes and at least one high energy device. Each of the plurality of wireless sensor nodes has a node role queue and a high energy device queue, and each of the node role queue and the high energy device queue is defined to have no more than two elements and initialized to be empty. The high energy device is configured to compute a node role of each surrounding wireless sensor node and to broadcast a message including the node role of each surrounding wireless sensor node and an identifier of the high energy device, in which the node role is one of a source node, a forwarding node and an affected node, and the wireless sensor node is configured to receive the message broadcast by the high energy device, to update the node role queue and the high energy device queue according to the message broadcast by the high energy device, and to adjust a behavior thereof according to the updated node role queue.

In some embodiments, when a new high energy device appears in the wireless sensor network, the new high energy device is configured to compute a node role of each surrounding wireless sensor node and to broadcast a message including the node role of each surrounding wireless sensor node and an identifier of the new high energy device, and the wireless sensor node is configured to receive the message broadcast by the new high energy device and to update the node role queue and the high energy device role according to the message broadcast by the new high energy device.

In some embodiments, when a high energy device quits the wireless sensor network, each of the plurality of wireless sensor nodes clears the node role defined by the quitting high energy device and the identifier of the quitting high energy device.

In some embodiments, the high energy device determines a wireless sensor node to be a source node when the wireless sensor node is within a communication zone of the high energy device and a next hop node is still within the communication zone of the high energy device; the high energy device determines a wireless sensor node to be a forwarding node when the wireless sensor node is within the communication zone of the high energy device and a next hop node is outside the communication zone of the high energy device; and the high energy device determines a wireless sensor node to be an affected node when the wireless sensor node is outside the communication zone of the high energy device and a next hop node is within the communication zone of the high energy device.

In some embodiments, the wireless sensor node is configured to: extract the node role and the identifier of the high energy device from the message broadcast by the high energy device, add the node role into the node role queue, and add the identifier of the high energy device into the high energy device queue, when the high energy device queue is empty or has one element; and discard the message broadcast by the high energy device when the high energy device queue has two elements.

In some embodiments, the wireless sensor node is configured to: sample sensor information and transmit the sensor information to a data gathering node via a shortest route or a tree route in a multi-hop wireless transmission way when the updated node role queue is empty; sample the sensor information and transmit the sensor information to the high energy device when the element in the updated node role queue is the source node; enter a dormancy state periodically when the element in the updated node role queue is the forwarding node, and receive the sensor information sent from the source node and transmitted by the high energy device and transmit the sensor information to a next hop node in a working state; transmit the sensor information to the forwarding node periodically when the element in the updated node role queue is the affected node, in which the wireless sensor node temporarily stores the sensor information when the forwarding node is in the dormancy state and transmits the sensor information to the forwarding node when the forwarding node is working; sample the sensor information and transmit the sensor information to a previous high energy device when the element in the updated node role queue is defined to be the source node by the previous high energy device and then defined to be the source node or the affected node by a subsequent high energy device; enter the dormancy state periodically when the element in the updated node role queue is defined to be the source node by the previous high energy device and then defined to be the forwarding node by the subsequent high energy device, and receive the sensor information from the subsequent high energy device and forward the sensor information to the previous high energy device in the working state; enter the dormancy state periodically when the element in the updated node role queue is defined to be the forwarding node by the previous high energy device and then defined to be the source node by the subsequent high energy device, and receive the sensor information from the previous high energy device and forward the sensor information to the subsequent high energy device in the working state; sample the sensor information and transmit the sensor information to the data gathering node via a shortest route or a tree route in a multi-hop wireless transmission way when the element in the updated node role queue is defined to be the forwarding node by the previous high energy device and then defined to be the forwarding node or the affected node by the subsequent energy device; transmit the sensor information to the subsequent high energy device directly when the element in the updated node role queue is defined to be the affected node by the previous high energy device and then defined to be the source node by the subsequent high energy device; and transmit the sensor information to the forwarding node periodically when the element in the updated node role queue is defined to be the affected node by the previous high energy device and then defined to be the forwarding node or the affected node by the subsequent high energy device, in which the wireless sensor node temporarily stores the sensor information when the forwarding node is in the dormancy state and transmits the sensor information to the forwarding node when the forwarding node is working.

The wireless sensor network according to the present disclosure has advantages of good robustness, high flexibility and better energy saving effect.

According to a third aspect of the present disclosure, a system for adjusting behaviors of wireless sensor nodes in a wireless sensor network is provided. The wireless sensor network comprises a plurality of wireless sensor nodes, each of the plurality of wireless sensor nodes has a node role queue and a high energy device queue, and each of the node role queue and the high energy device queue is defined to have no more than two elements and initialized to be empty. The system further comprises at least one high energy device. The high energy device is configured to compute a node role of each surrounding wireless sensor node and to broadcast a message including the node role of each surrounding wireless sensor node and an identifier of the high energy device, in which the node role is one of a source node, a forwarding node and an affected node, and the wireless sensor node is configured to receive the message broadcast by the high energy device, to update the node role queue and the high energy device queue according to the message broadcast by the high energy device, and to adjust a behavior thereof according to the updated node role queue.

In some embodiments, when a new high energy device appears, the new high energy device is configured to compute a node role of each surrounding wireless sensor node and to broadcast a message including the node role of each surrounding wireless sensor node and an identifier of the new high energy device, and the wireless sensor node is configured to receive the message broadcast by the new high energy device and to update the node role queue and the high energy device role according to the message broadcast by the new high energy device.

In some embodiments, when a high energy device quits the system, each of the plurality of wireless sensor nodes clears the node role defined by the quitting high energy device and the identifier of the quitting high energy device.

In some embodiments, the high energy device determines a wireless sensor node to be a source node when the wireless sensor node is within a communication zone of the high energy device and a next hop node is still within the communication zone of the high energy device; the high energy device determines a wireless sensor node to be a forwarding node when the wireless sensor node is within the communication zone of the high energy device and a next hop node is outside the communication zone of the high energy device; and the high energy device determines a wireless sensor node to be an affected node when the wireless sensor node is outside the communication zone of the high energy device and a next hop node is within the communication zone of the high energy device.

In some embodiments, the wireless sensor node is configured to: extract the node role and the identifier of the high energy device from the message broadcast by the high energy device, add the node role into the node role queue, and add the identifier of the high energy device into the high energy device queue, when the high energy device queue is empty or has one element; and discard the message broadcast by the high energy device when the high energy device queue has two elements.

In some embodiments, the wireless sensor node is configured to: sample sensor information and transmit the sensor information to a data gathering node via a shortest route or a tree route in a multi-hop wireless transmission way when the updated node role queue is empty; sample the sensor information and transmit the sensor information to the high energy device when the element in the updated node role queue is the source node; enter a dormancy state periodically when the element in the updated node role queue is the forwarding node, and receive the sensor information sent from the source node and transmitted by the high energy device and transmit the sensor information to a next hop node in a working state; transmit the sensor information to the forwarding node periodically when the element in the updated node role queue is the affected node, in which the wireless sensor node temporarily stores the sensor information when the forwarding node is in the dormancy state and transmits the sensor information to the forwarding node when the forwarding node is working; sample the sensor information and transmit the sensor information to a previous high energy device when the element in the updated node role queue is defined to be the source node by the previous high energy device and then defined to be the source node or the affected node by a subsequent high energy device; enter the dormancy state periodically when the element in the updated node role queue is defined to be the source node by the previous high energy device and then defined to be the forwarding node by the subsequent high energy device, and receive the sensor information from the subsequent high energy device and forward the sensor information to the previous high energy device in the working state; enter the dormancy state periodically when the element in the updated node role queue is defined to be the forwarding node by the previous high energy device and then defined to be the source node by the subsequent high energy device, and receive the sensor information from the previous high energy device and forward the sensor information to the subsequent high energy device in the working state; sample the sensor information and transmit the sensor information to the data gathering node via a shortest route or a tree route in a multi-hop wireless transmission way when the element in the updated node role queue is defined to be the forwarding node by the previous high energy device and then defined to be the forwarding node or the affected node by the subsequent energy device; transmit the sensor information to the subsequent high energy device directly when the element in the updated node role queue is defined to be the affected node by the previous high energy device and then defined to be the source node by the subsequent high energy device; and transmit the sensor information to the forwarding node periodically when the element in the updated node role queue is defined to be the affected node by the previous high energy device and then defined to be the forwarding node or the affected node by the subsequent high energy device, in which the wireless sensor node temporarily stores the sensor information when the forwarding node is in the dormancy state and transmits the sensor information to the forwarding node when the forwarding node is working.

The system for adjusting behaviors of wireless sensor nodes in a wireless sensor network according to the present disclosure has advantages of good robustness, high flexibility and better energy saving effect.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
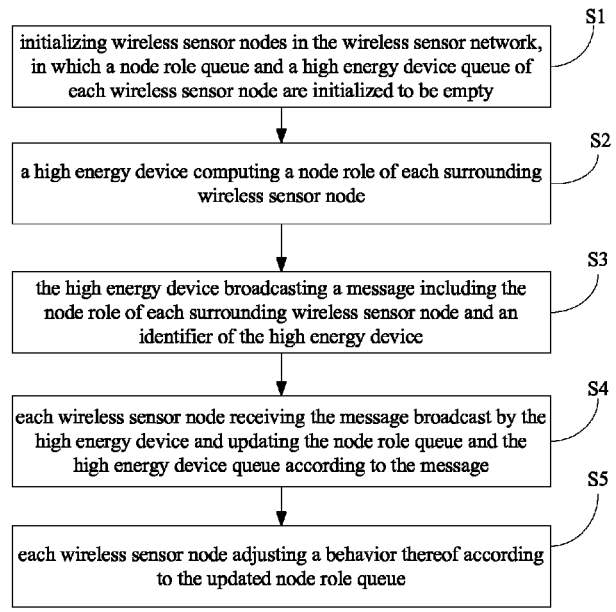
FIG. 1 is a flow chart of a method for adjusting behaviors of wireless sensor nodes in a wireless sensor network according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

According to embodiments of the present disclosure, a method for adjusting behaviors of wireless sensor nodes in a wireless sensor network is provided. As shown in FIG. 1, the method includes following steps.

At step S1, wireless sensor nodes in the wireless sensor network are initialized.

Each wireless sensor node in the wireless sensor network has a node role queue and a high energy device queue. Each of the node role queue and the high energy device queue is defined to have no more than two elements.

During initialization, the node role queue is empty and denoted as R={ }, the high energy device is also empty and denoted as H={ }. At this time, each wireless sensor node is a normal node and is denoted as normal.

At step S2, a high energy device in the wireless sensor network computes a node role of each surrounding wireless sensor node. The node role is one of a source node, a forwarding node and an affected node.

When the wireless sensor node is within a communication zone of the high energy device and a next hop node is still within the communication zone of the high energy device, the high energy device determines the wireless sensor node to be the source node.

When the wireless sensor node is within the communication zone of the high energy device but a next hop node is outside the communication zone of the high energy device, the high energy device determines the wireless sensor node to be the forwarding node.

When the wireless sensor node is outside the communication zone of the high energy device but a next hop node is within the communication zone of the high energy device, the high energy device determines the wireless sensor node to be the affected node.

At step S3, the high energy device broadcasts a message including the node role of each surrounding wireless sensor node and an identifier of the high energy device.

At step S4, each wireless sensor node receives the message broadcast by the high energy device and updates the node role queue and the high energy device queue.

It should be noted that, the source node and the forwarding node can receive the broadcast message directly, but the affected node only can receive the information forwarded by the forwarding node.

When the high energy device queue of the wireless sensor node is empty or has one element, the wireless sensor node extracts the node role from the broadcast message and adds the node role into the node role queue, and extracts the identifier of the high energy device from the broadcast message and adds the identifier into the high energy device queue. For example, when the high energy device queue of the wireless sensor node is empty, the wireless sensor node extracts the node role from the broadcast message and adds it into the node role queue, e.g., R={role0}, and the wireless sensor node extracts the identifier of the high energy device from the broadcast message and adds it into the high energy device queue, e.g., H={device0}. When the high energy device queue of the wireless sensor node already has one element, e.g., H={device0}, the wireless sensor node still extracts the node role from the broadcast message and adds it into the node role queue, e.g., R={role0, role1}, and the wireless sensor node still extracts the identifier of the high energy device from the broadcast message and adds it into the high energy device queue, e.g., H={device0, device1}.

When the high energy device queue of the wireless sensor node has two elements, the broadcast message is discarded.

At step S5, each wireless sensor node adjusts a behavior thereof according to the updated node role queue.

Specifically, the wireless sensor node adjusts the behavior thereof as follows.

E1: When the updated node role queue is empty, the wireless sensor node samples the sensor information and transmits the sensor information to a data gathering node via a shortest route or a tree route in a multi-hop wireless transmission way. In this case, each wireless sensor node acts as the normal node.

E2: When the element in the updated node role queue is the source node, the wireless sensor node samples the sensor information and transmits the sensor information to the high energy device. In contrast to the normal node, the source node transmits the sensor information to the high energy device rather than the next hop wireless sensor node.

E3: When the element in the updated node role queue is the forwarding node, the wireless sensor node enters a dormancy state periodically. When the wireless sensor node is in a working state, the high energy device transmits the sensor information sent from the source node to the wireless sensor node, and then the wireless sensor node transmits the sensor information to its next hop wireless sensor node. When the wireless sensor node is in the dormancy state, the wireless sensor node does not work, thus saving energy.

E4: When the element in the updated node role queue is the affected node, the wireless sensor node temporarily stores the sensor information when the forwarding node is in the dormancy state, and transmits the sensor information to the forwarding node when the forwarding node is in the working state.

E5: When the element in the updated node role queue is defined as the source node by a previous high energy device and then defined as the source node or the affected node by a subsequent high energy device, the wireless sensor node samples the sensor information and transmits the sensor information to the previous high energy device. For example, if the node role queue is R={role0, role1}, the high energy device queue is H={device0, device1}, in which role0 represents the source node defined by device0 and role1 represents the source node or the affected node defined by device1, then the new node role role1 does not influence the behavior of the source node defined by device0.

E6: When the element in the updated node role queue is defined as the source node by the previous high energy device and then defined as the forwarding node by the subsequent high energy device, the wireless sensor node enters the dormancy state periodically. When the wireless sensor node is in the working state, it receives the sensor information from the subsequent high energy device and forwards the sensor information to the previous high energy device. For example, if the node role queue is R={role0, role1}, the high energy device queue is H={device0, device1}, in which role0 represents the source node defined by device0 and role1 represents the forwarding node defined by device1, then the wireless sensor node receives the sensor information from device1 and then forwards it to device0 in the working state. When the wireless sensor node is in the dormancy state, the wireless sensor node does not work, thus saving energy.

E7: When the element in the updated node role queue is defined as the forwarding node by the previous high energy device and then defined as the source node by the subsequent high energy device, the wireless sensor node enters the dormancy state periodically. When the wireless sensor node is in the working state, it receives the sensor information from the previous high energy device and then forwards the sensor information to the subsequent high energy device. For example, if the node role queue is R={role0, role1}, the high energy device queue is H={device0, device1}, in which role0 represents the forwarding node defined by device0 and role1 represents the source node defined by device1, then the wireless sensor node receives the sensor information from device0 and then forwards it to device1 in the working state. When the wireless sensor node is in the dormancy state, the wireless sensor node does not work, thus saving energy.

E8: When the element in the updated node role queue is defined as the forwarding node by the previous high energy device and then defined as the forwarding node or the affected node by the subsequent high energy device, the wireless sensor node is always in the working state. Specifically, the wireless sensor node samples the sensor information and transmits the sensor information to the data gathering node via the shortest route or the tree route in the multi-hop wireless transmission way. In this case, the wireless sensor node acts as the normal node.

E9: When the element in the updated node role queue is defined as the affected node by the previous high energy device and then defined as the source node by the subsequent high energy device, the wireless sensor node transmits the sensor information to the subsequent high energy device directly. For example, if the node role queue is R={role0, role1}, the high energy device queue is H={device0, device1}, in which role0 represents the affected node defined by device0 and role1 represents the source node defined by device1, then the wireless sensor node directly transmits the sensor information to device1.

E10: When the element in the updated node role queue is defined as the affected node by the previous high energy device and then defined as the forwarding node or the affected node by the subsequent high energy device, the wireless sensor node temporarily stores the sensor information when the forwarding node is in the dormancy state and transmits the sensor information to the forwarding node when the forwarding node is in the working state. For example, if the node role queue is R={role0, role1}, the high energy device queue is H={device0, device1}, in which role0 represents the affected node defined by device0 and role1 represents the forwarding node or the affected node defined by device1, then the new node role role1 does not influence the behavior of the affected node defined by device0 and the wireless sensor node acts the same as in E4.

The method for adjusting behaviors of wireless sensor nodes in the wireless sensor network according to the present disclosure has advantages of good robustness, high flexibility and better energy saving effect.

In one embodiment of the present disclosure, the method further comprises repeating step S2~S5 when a new high energy device appears in the wireless sensor network. Specifically, when a new high energy device appears in the wireless sensor network, the new high energy device computes the node roles of its surrounding wireless sensor nodes and broadcasts a message including the node roles of its surrounding wireless sensor nodes and the identifier of the new high energy device.

In another embodiment of the present disclosure, the method further comprises the following step. When a high energy device quits the wireless sensor network, each wireless sensor node clears the node role defined by the quitting high energy device from the node role queue and clears the identifier of the quitting high energy device from the high energy device queue, and then step S5 is executed. At this time, if each of the node role queue and the high energy device queue has only one element, procedures in any of E2~E4 are executed, and if both the node role queue and the high energy device queue are empty, procedures in E1 are executed.

For better understanding, the method for adjusting behaviors of wireless sensor nodes in the wireless sensor network according to the present disclosure will be described in detail with reference to specific examples.

Figure 2:
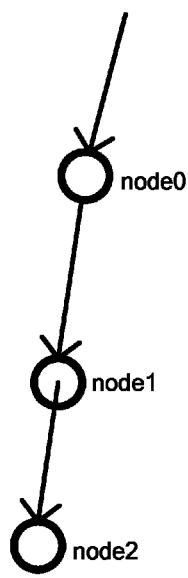
FIG. 2 is a topological graph of a wireless sensor network without high energy devices.

FIG. 2 is a topological graph of a wireless sensor network without high energy devices. As shown in FIG. 2, there are three wireless sensor nodes, node0, node1 and node2 in the wireless sensor network. Each wireless sensor node can generate sensor information and receive the sensor information transmitted from other wireless sensor nodes. For example, node1 can receive the sensor information from node0. With the wireless transmission, these sensor information are finally gathered at the data gathering node. node1 is a next hop node of node0, and node2 is a next hop node of node1. Before a high energy device appears, all the three wireless sensor nodes are normal nodes, and the node role queues and high energy device queues thereof are empty, i.e. R0={ }, R1={ }, R2={ }, H0={ }, H1={ }, and H2={ }.

Figure 3:
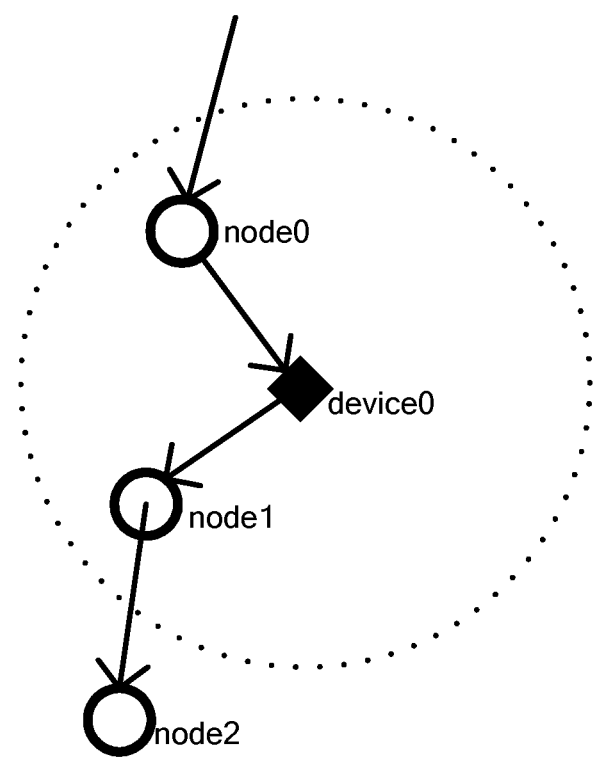
FIG. 3 is a topological graph of a wireless sensor network with a first high energy device.

FIG. 3 is a topological graph of a wireless sensor network with a first high energy device. When the first high energy device device0 appears in the wireless sensor network area, node0, node1 and node2 are defined as the source node, the forwarding node and the affected node respectively. At this time, R0={source node}, R1={forwarding node}, R2={affected node}, H0={device0}, H1={device0}, and H2={device0}. node0 acts as the source node according to the node role queue R0, samples the sensor information and transmits the sensor information to the high energy device device0. node1 acts as the forwarding node according to the node role queue R1. When the forwarding node node1 is in the working state, the high energy device transmits the sensor information sent from the source node node0 to the forwarding node node1, and then the forwarding node node1 transmits the sensor information to its next hop node. When the forwarding node node1 is in the dormancy state, the forwarding node node1 does not work, thus saving energy. node2 acts as the affected node according to the node role queue R2. When the forwarding node node1 is in the dormancy state, the affected node node2 temporarily stores the sensor information, and when the forwarding node node1 is in the working state, the affected node node2 transmits the sensor information to the forwarding node node1. When the first high energy device device0 leaves the wireless sensor network area, the wireless sensor nodes clear the node roles defined by the high energy device device0 and the identifier of the high energy device device0, and forward the sensor information according to the topological graph shown in FIG. 2.

Figure 4:
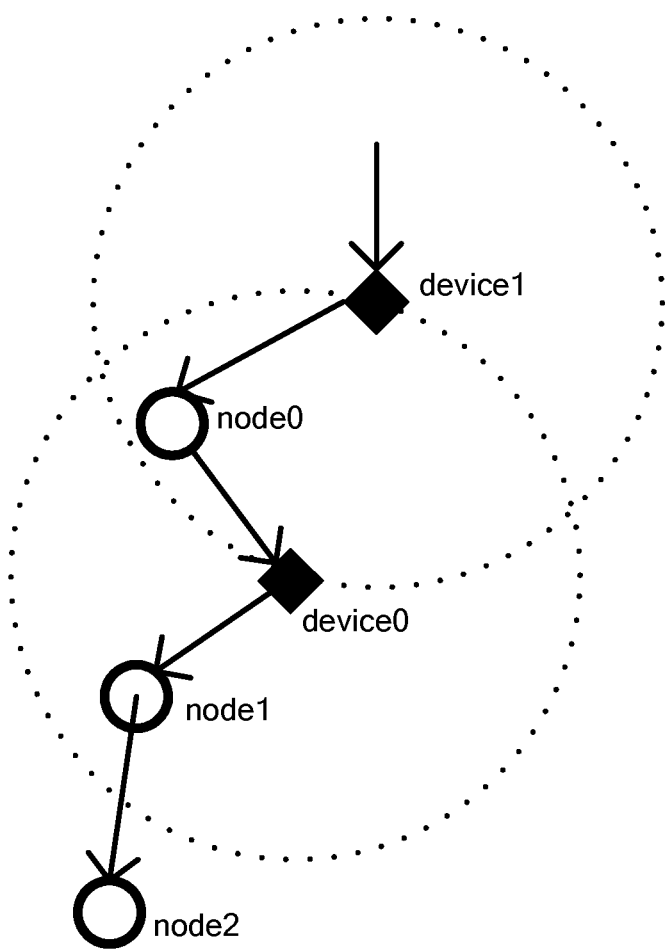
FIG. 4 is a topological graph of a wireless sensor network with first and second high energy devices.

FIG. 4 is a topological graph of a wireless sensor network with first and second high energy devices. As shown in FIG. 4, when the second high energy device device1 appears in the wireless sensor network area, it defines new node roles for the wireless sensor nodes (i.e. node0 and node1) in the communication zone thereof. At this time, R0={source node, forwarding node}, R1={forwarding node, affected node}, R2={affected node}, H0={device0, device1}, H1={device0, device1}, and H2={device0}. When node0 is in the working state, node0 receives the sensor information from device1, transmits the sensor information to device0 and enters the dormancy state periodically according to the instruction from device1. At this time, node1 acts as the normal node, and node2 still acts in the way before the second high energy device device1 appears. When the second high energy device device1 leaves the wireless sensor network area, the wireless sensor nodes clear the node roles defined by the high energy device device1 and the identifier of the high energy device device1, and forward the sensor information according to the topological graph shown in FIG. 3.

Figure 5:
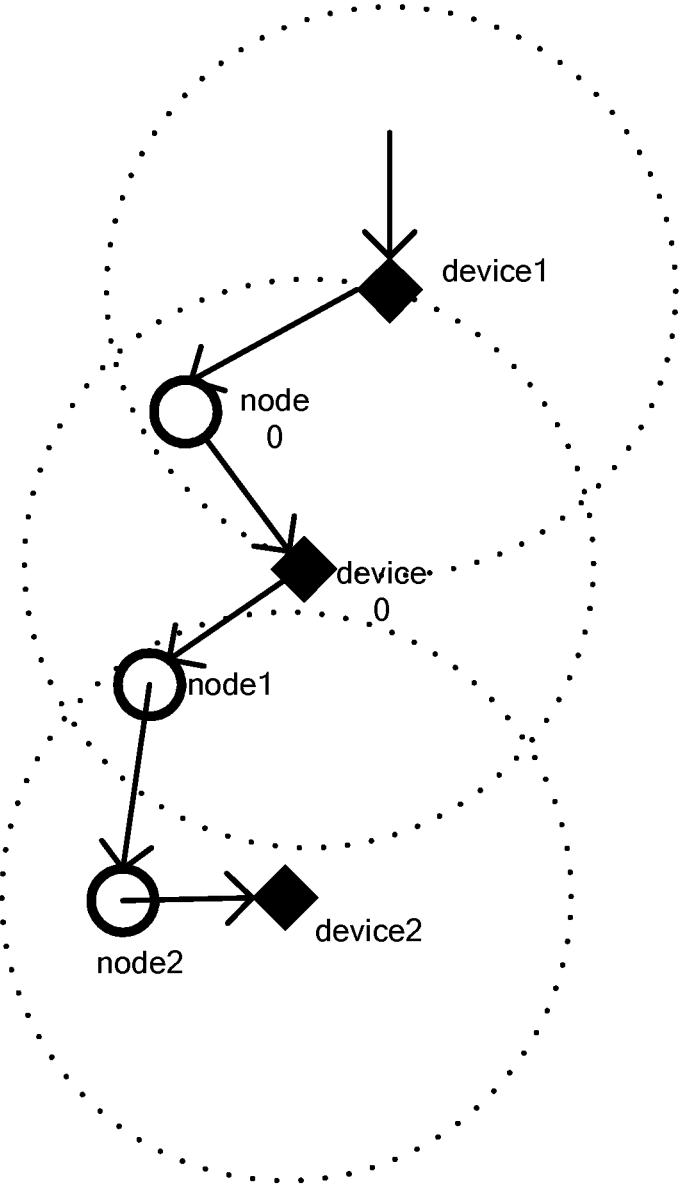
FIG. 5 is a topological graph of a wireless sensor network with first, second and third high energy devices.

It should be noted that, when a third high energy device appears in the wireless sensor network (as shown in FIG. 5) or more high energy devices appear in the wireless sensor network, node2 can be defined with a new node role, and the numbers of elements in the node role queue and the high energy device queue of node2 both become two. However, since the node role queues and the high energy device queues of node0 and node1 already have two elements, even if node0 and node1 receive the broadcast messages sent from other high energy devices, the broadcast messages are discarded.

The method for adjusting behaviors of wireless sensor nodes in the wireless sensor network according to embodiments of the present disclosure has advantages of good robustness, high flexibility and better energy saving effect.

According to embodiments of the present disclosure, a wireless sensor network is provided. As shown FIGS. 3-5, the wireless sensor network comprises a plurality of wireless sensor nodes and at least one high energy device. Each wireless sensor node has a node role queue and a high energy device queue. Each of the node role queue and the high energy device queue is defined to have no more than two elements and initialized to be empty.

The high energy device is configured to compute a node role of each surrounding wireless sensor node and to broadcast a message including the node role of each surrounding wireless sensor node and an identifier of the high energy device, in which the node role is one of a source node, a forwarding node and an affected node, and each wireless sensor node is configured to receive the message broadcast by the high energy device, to update the node role queue and the high energy device queue according to the message, and to adjust a behavior thereof according to the updated node role queue.

In one embodiment, the high energy device determines a wireless sensor node to be a source node when the wireless sensor node is within a communication zone of the high energy device and a next hop node is still within the communication zone of the high energy device; the high energy device determines a wireless sensor node to be a forwarding node when the wireless sensor node is within the communication zone of the high energy device and a next hop node is outside the communication zone of the high energy device; and the high energy device determines a wireless sensor node to be an affected node when the wireless sensor node is outside the communication zone of the high energy device and a next hop node is within the communication zone of the high energy device.

In some embodiments, when the high energy device queue is empty or has one element, the wireless sensor node extracts the node role and the identifier of the high energy device from the message broadcast by the high energy device, adds the node role into the node role queue, and adds the identifier of the high energy device into the high energy device queue; when the high energy device queue has two elements, the wireless sensor node discards the message broadcast by the high energy device.

Specifically, the wireless sensor node adjusts the behavior thereof as follows.

E1: When the updated node role queue is empty, the wireless sensor node samples the sensor information and transmits the sensor information to a data gathering node via a shortest route or a tree route in a multi-hop wireless transmission way. In this case, each wireless sensor node acts as the normal node.

E2: When the element in the updated node role queue is the source node, the wireless sensor node samples the sensor information and transmits the sensor information to the high energy device. In contrast to the normal node, the source node transmits the sensor information to the high energy device rather than the next hop wireless sensor node.

E3: When the element in the updated node role queue is the forwarding node, the wireless sensor node enters a dormancy state periodically. When the wireless sensor node is in a working state, the high energy device transmits the sensor information sent from the source node to the wireless sensor node, and then the wireless sensor node transmits the sensor information to its next hop wireless sensor node. When the wireless sensor node is in the dormancy state, the wireless sensor node does not work, thus saving energy.

E4: When the element in the updated node role queue is the affected node, the wireless sensor node temporarily stores the sensor information when the forwarding node is in the dormancy state, and transmits the sensor information to the forwarding node when the forwarding node is in the working state.

E5: When the element in the updated node role queue is defined as the source node by a previous high energy device and then defined as the source node or the affected node by a subsequent high energy device, the wireless sensor node samples the sensor information and transmits the sensor information to the previous high energy device. For example, if the node role queue is R={role0, role1}, the high energy device queue is H={device0, device1}, in which role0 represents the source node defined by device0 and role1 represents the source node or affected node defined by device1, then the new node role role1 does not influence the behavior of the source node defined by device0.

E6: When the element in the updated node role queue is defined as the source node by the previous high energy device and then defined as the forwarding node by the subsequent high energy device, the wireless sensor node enters the dormancy state periodically. When the wireless sensor node is in the working state, it receives the sensor information from the subsequent high energy device and forwards the sensor information to the previous high energy device. For example, if the node role queue is R={role0, role1}, the high energy device queue is H={ device0, device1}, in which role0 represents the source node defined by device0 and role1 represents the forwarding node defined by device1, then the wireless sensor node receives the sensor information from device1 and then forwards it to device0 in the working state. When the wireless sensor node is in the dormancy state, the wireless sensor node does not work, thus saving energy.

E7: When the element in the updated node role queue is defined as the forwarding node by the previous high energy device and then defined as the source node by the subsequent high energy device, the wireless sensor node enters the dormancy state periodically. When the wireless sensor node is in the working state, it receives the sensor information from the previous high energy device and then forwards the sensor information to the subsequent high energy device. For example, if the node role queue is R={role0, role1}, the high energy device queue is H={device0, device1}, in which role0 represents the forwarding node defined by device0 and role1 represents the source node defined by device1, then the wireless sensor node receives the sensor information from device0 and then forwards it to device1 in the working state. When the wireless sensor node is in the dormancy state, the wireless sensor node does not work, thus saving energy.

E8: When the element in the updated node role queue is defined as the forwarding node by the previous high energy device and then defined as the forwarding node or the affected node by the subsequent high energy device, the wireless sensor node is always in the working state. Specifically, the wireless sensor node samples the sensor information and transmits the sensor information to the data gathering node via the shortest route or the tree route in the multi-hop wireless transmission way. In this case, the wireless sensor node acts as the normal node.

E9: When the element in the updated node role queue is defined as the affected node by the previous high energy device and then defined as the source node by the subsequent high energy device, the wireless sensor node transmits the sensor information to the subsequent high energy device directly. For example, if the node role queue is R={role0, role1}, the high energy device queue is H={device0, device1}, in which role0 represents the affected node defined by device0 and role1 represents the source node defined by device1, then the wireless sensor node directly transmits the sensor information to device1.

E10: When the element in the updated node role queue is defined as the affected node by the previous high energy device and then defined as the forwarding node or the affected node by the subsequent high energy device, the wireless sensor node temporarily stores the sensor information when the forwarding node is in the dormancy state and transmits the sensor information to the forwarding node when the forwarding node is in the working state. For example, if the node role queue is R={role0, role1}, the high energy device queue is H={device0, device1}, in which role0 represents the affected node defined by device0 and role1 represents the forwarding node or affected node defined by device1, then the new node role role1 does not influence the behavior of the affected node defined by device0 and the wireless sensor node acts the same as in E4.

When a new high energy device appears in the wireless sensor network, the new high energy device is configured to compute a node role of each surrounding wireless sensor node and to broadcast a message including the node role of each surrounding wireless sensor node and an identifier of the new high energy device, and the wireless sensor node is configured to receive the message broadcast by the new high energy device and to update the node role queue and the high energy device role according to the message broadcast by the new high energy device.

When a high energy device quits the wireless sensor network, each of the plurality of wireless sensor nodes clears the node role defined by the quitting high energy device and the identifier of the quitting high energy device.

The wireless sensor network according to embodiments of the present disclosure has advantages of good robustness, high flexibility and better energy saving effect.

According to embodiments of the present disclosure, a system for adjusting behaviors of wireless sensor nodes in a wireless sensor network is provided.

As shown in FIGS. 3-5, the wireless sensor network comprises a plurality of wireless sensor nodes. Each wireless sensor node has a node role queue and a high energy device queue, and each of the node role queue and the high energy device queue is defined to have no more than two elements and initialized to be empty. The system further comprises at least one high energy device.

The high energy device is configured to compute a node role of each surrounding wireless sensor node and to broadcast a message including the node role of each surrounding wireless sensor node and an identifier of the high energy device, in which the node role is one of a source node, a forwarding node and an affected node, and each wireless sensor node is configured to receive the message broadcast by the high energy device, to update the node role queue and the high energy device queue according to the message, and to adjust a behavior thereof according to the updated node role queue.

In one embodiment, the high energy device determines a wireless sensor node to be a source node when the wireless sensor node is within a communication zone of the high energy device and a next hop node is still within the communication zone of the high energy device; the high energy device determines a wireless sensor node to be a forwarding node when the wireless sensor node is within the communication zone of the high energy device and a next hop node is outside the communication zone of the high energy device; and the high energy device determines a wireless sensor node to be an affected node when the wireless sensor node is outside the communication zone of the high energy device and a next hop node is within the communication zone of the high energy device.

In some embodiments, when the high energy device queue is empty or has one element, the wireless sensor node extracts the node role and the identifier of the high energy device from the message broadcast by the high energy device, adds the node role into the node role queue, and adds the identifier of the high energy device into the high energy device queue; when the high energy device queue has two elements, the wireless sensor node discards the message broadcast by the high energy device.

Specifically, the wireless sensor node adjusts the behavior thereof as follows.

E1: When the updated node role queue is empty, the wireless sensor node samples the sensor information and transmits the sensor information to a data gathering node via a shortest route or a tree route in a multi-hop wireless transmission way. In this case, each wireless sensor node acts as the normal node.

E2: When the element in the updated node role queue is the source node, the wireless sensor node samples the sensor information and transmits the sensor information to the high energy device. In contrast to the normal node, the source node transmits the sensor information to the high energy device rather than the next hop wireless sensor node.

E3: When the element in the updated node role queue is the forwarding node, the wireless sensor node enters a dormancy state periodically. When the wireless sensor node is in a working state, the high energy device transmits the sensor information sent from the source node to the wireless sensor node, and then the wireless sensor node transmits the sensor information to its next hop wireless sensor node. When the wireless sensor node is in the dormancy state, the wireless sensor node does not work, thus saving energy.

E4: When the element in the updated node role queue is the affected node, the wireless sensor node temporarily stores the sensor information when the forwarding node is in the dormancy state, and transmits the sensor information to the forwarding node when the forwarding node is in the working state.

E5: When the element in the updated node role queue is defined as the source node by a previous high energy device and then defined as the source node or the affected node by a subsequent high energy device, the wireless sensor node samples the sensor information and transmits the sensor information to the previous high energy device. For example, if the node role queue is R={role0, role1}, the high energy device queue is H={device0, device1}, in which role0 represents the source node defined by device0 and role1 represents the source node or affected node defined by device1, then the new node role role1 does not influence the behavior of the source node defined by device0.

E6: When the element in the updated node role queue is defined as the source node by the previous high energy device and then defined as the forwarding node by the subsequent high energy device, the wireless sensor node enters the dormancy state periodically. When the wireless sensor node is in the working state, it receives the sensor information from the subsequent high energy device and forwards the sensor information to the previous high energy device. For example, if the node role queue is R={role0, role1}, the high energy device queue is H={device0, device1}, in which role0 represents the source node defined by device0 and role1 represents the forwarding node defined by device1, then the wireless sensor node receives the sensor information from device1 and then forwards it to device0 in the working state. When the wireless sensor node is in the dormancy state, the wireless sensor node does not work, thus saving energy.

E7: When the element in the updated node role queue is defined as the forwarding node by the previous high energy device and then defined as the source node by the subsequent high energy device, the wireless sensor node enters the dormancy state periodically. When the wireless sensor node is in the working state, it receives the sensor information from the previous high energy device and then forwards the sensor information to the subsequent high energy device. For example, if the node role queue is R={role0, role1}, the high energy device queue is H={device0, device1}, in which role0 represents the forwarding node defined by device0 and role1 represents the source node defined by device1, then the wireless sensor node receives the sensor information from device0 and then forwards it to device1 in the working state. When the wireless sensor node is in the dormancy state, the wireless sensor node does not work, thus saving energy.

E8: When the element in the updated node role queue is defined as the forwarding node by the previous high energy device and then defined as the forwarding node or the affected node by the subsequent high energy device, the wireless sensor node is always in the working state. Specifically, the wireless sensor node samples the sensor information and transmits the sensor information to the data gathering node via the shortest route or the tree route in the multi-hop wireless transmission way. In this case, the wireless sensor node acts as the normal node.

E9: When the element in the updated node role queue is defined as the affected node by the previous high energy device and then defined as the source node by the subsequent high energy device, the wireless sensor node transmits the sensor information to the subsequent high energy device directly. For example, if the node role queue is R={role0, role1}, the high energy device queue is H={device0, device1}, in which role0 represents the affected node defined by device0 and role1 represents the source node defined by device1, then the wireless sensor node directly transmits the sensor information to device1.

E10: When the element in the updated node role queue is defined as the affected node by the previous high energy device and then defined as the forwarding node or the affected node by the subsequent high energy device, the wireless sensor node temporarily stores the sensor information when the forwarding node is in the dormancy state and transmits the sensor information to the forwarding node when the forwarding node is in the working state. For example, if the node role queue is R={role0, role1}, the high energy device queue is H={device0, device1}, in which role0 represents the affected node defined by device0 and role1 represents the forwarding node or affected node defined by device1, then the new node role role1 does not influence the behavior of the affected node defined by device0 and the wireless sensor node acts the same as in E4.

When a new high energy device appears in the wireless sensor network, the new high energy device is configured to compute a node role of each surrounding wireless sensor node and to broadcast a message including the node role of each surrounding wireless sensor node and an identifier of the new high energy device, and the wireless sensor node is configured to receive the message broadcast by the new high energy device and to update the node role queue and the high energy device role according to the message broadcast by the new high energy device.

When a high energy device quits the wireless sensor network, each of the plurality of wireless sensor nodes clears the node role defined by the quitting high energy device and the identifier of the quitting high energy device.

The system for adjusting behaviors of wireless sensor nodes in the wireless sensor network according to embodiments of the present disclosure has advantages of good robustness, high flexibility and better energy saving effect.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

One or more elements of the system for adjusting behaviors of wireless sensor nodes in the wireless sensor network and any acts of the methods disclosed herein may be implemented, for example, on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-transitory computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor. For example one or more parts of the system may be implemented by a computer processor with associated memory and timing circuitry (not separately shown) that is a functional part of the system and is activated by, and facilitates functionality of other components or parts of the system.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for adjusting behaviors of nodes in a wireless sensor network, comprising:
   A: initializing wireless sensor nodes in the wireless sensor network, in which each of the wireless sensor nodes has a node role queue and a high energy device role queue, and each of the node role queue and the high energy device role queue is defined to have no more than two elements and initialized to be empty;
   B: for a high energy device in the wireless sensor network, computing a node role of each surrounding wireless sensor node, in which the node role is one of a source node, a forwarding node and an affected node;
   C: for the high energy device, broadcasting a message including the node role of each surrounding wireless sensor node and an identifier of the high energy device;
   D: for each surrounding wireless sensor node, receiving the message broadcast by the high energy device and updating the node role queue and the high energy device role queue according to the message; and
   E: for each surrounding wireless sensor node, adjusting a behavior thereof according to the updated node role queue.

2. The method according to claim 1, further comprising:
repeating steps B~E when a new high energy device appears in the wireless sensor network.

3. The method according to claim 1, further comprising:
when the high energy device quits the wireless sensor network, for each surrounding wireless sensor node in the wireless sensor network, clearing the node role defined by the quitting high energy device and the identifier of the quitting high energy device and then executing step E.

4. The method according to claim 1, wherein
the high energy device determines a surrounding wireless sensor node to be a source node when the surrounding wireless sensor node is within a communication zone of the high energy device and a next hop node is still within the communication zone of the high energy device;
the high energy device determines a surrounding wireless sensor node to be a forwarding node when the surrounding wireless sensor node is within the communication zone of the high energy device and a next hop node is outside the communication zone of the high energy device; and
the high energy device determines a surrounding wireless sensor node to be an affected node when the surrounding wireless sensor node is outside the communication zone of the high energy device and a next hop node is within the communication zone of the high energy device.

5. The method according to claim 1, wherein updating the node role queue and the high energy device role queue according to the message comprises:
extracting the node role and the identifier of the high energy device from the message broadcast by the high energy device, adding the node role into the node role queue, and adding the identifier of the high energy device into the high energy device role queue, when the high energy device role queue is empty or has one element; and
discarding the message broadcast by the high energy device when the high energy device role queue has two elements.

6. The method according to claim 1, wherein
when the updated node role queue is empty, the surrounding wireless sensor node samples sensor information and transmits the sensor information to a data gathering node via a shortest route or a tree route in a multi-hop wireless transmission way;
when the element in the updated node role queue is the source node, the surrounding wireless sensor node samples the sensor information and transmits the sensor information to the high energy device;
when the element in the updated node role queue is the forwarding node, the surrounding wireless sensor node enters a dormancy state periodically, and when the surrounding wireless sensor node is working, the high energy device transmits the sensor information sent from the source node to the surrounding wireless sensor node and the surrounding wireless sensor node transmits the sensor information to a next hop node;
when the element in the updated node role queue is the affected node, the surrounding wireless sensor node temporarily stores the sensor information when the forwarding node is in the dormancy state and transmits the sensor information to the forwarding node when the forwarding node is working;
when the element in the updated node role queue is defined to be the source node by a previous high energy device and then defined to be the source node or the affected node by a subsequent high energy device, the surrounding wireless sensor node samples the sensor information and transmits the sensor information to the previous high energy device;
when the element in the updated node role queue is defined to be the source node by the previous high energy device and then defined to be the forwarding node by the subsequent high energy device, the surrounding wireless sensor node enters the dormancy state periodically, and when the surrounding wireless sensor node is working, the surrounding wireless sensor node receives the sensor information from the subsequent high energy device and forwards the sensor information to the previous high energy device;
when the element in the updated node role queue is defined to be the forwarding node by the previous high energy device and then defined to be the source node by the subsequent high energy device, the surrounding wireless sensor node enters the dormancy state periodically, and when the surrounding wireless sensor node is working, the surrounding wireless sensor node receives the sensor information from the previous high energy device and forwards the sensor information to the subsequent high energy device;
when the element in the updated node role queue is defined to be the forwarding node by the previous high energy device and then defined to be the forwarding node or the affected node by the subsequent energy device, the surrounding wireless sensor node samples the sensor information and transmits the sensor information to the data gathering node via a shortest route or a tree route in a multi-hop wireless transmission way;
when the element in the updated node role queue is defined to be the affected node by the previous high energy device and then defined to be the source node by the subsequent high energy device, the surrounding wireless sensor node transmits the sensor information to the subsequent high energy device directly; and
when the element in the updated node role queue is defined to be the affected node by the previous high energy device and then defined to be the forwarding node or the affected node by the subsequent high energy device, the surrounding wireless sensor node temporarily stores the sensor information when the forwarding node is in the dormancy state and transmits the sensor information to the forwarding node when the forwarding node is working.

7. A wireless sensor network, comprising a plurality of wireless sensor nodes and at least one high energy device, wherein each of the plurality of wireless sensor nodes has a node role queue and a high energy device role queue, each of the node role queue and the high energy device role queue is defined to have no more than two elements and initialized to be empty,
the high energy device is configured to compute a node role of each surrounding wireless sensor node and to broadcast a message including the node role of each surrounding wireless sensor node and an identifier of the high energy device, in which the node role is one of a source node, a forwarding node and an affected node, and
the surrounding wireless sensor node is configured to receive the message broadcast by the high energy device, to update the node role queue and the high energy device role queue according to the message, and to adjust a behavior thereof according to the updated node role queue.

8. The wireless sensor network according to claim 7, wherein when a new high energy device appears in the wireless sensor network, the new high energy device is configured to compute a node role of each surrounding wireless sensor node and to broadcast a message including the node role of each surrounding wireless sensor node and an identifier of the new high energy device, and the surrounding wireless sensor node is configured to receive the message broadcast by the new high energy device and to update the node role queue and the high energy device role according to the message broadcast by the new high energy device.

9. The wireless sensor network according to claim 7, wherein when the high energy device quits the wireless sensor network, each of the plurality of surrounding wireless sensor nodes clears the node role defined by the quitting high energy device and the identifier of the quitting high energy device.

10. The wireless sensor network according to claim 7, wherein
the high energy device determines a surrounding wireless sensor node to be a source node when the surrounding wireless sensor node is within a communication zone of the high energy device and a next hop node is still within the communication zone of the high energy device;
the high energy device determines a surrounding wireless sensor node to be a forwarding node when the surrounding wireless sensor node is within the communication zone of the high energy device and a next hop node is outside the communication zone of the high energy device; and
the high energy device determines a surrounding wireless sensor node to be an affected node when the surrounding wireless sensor node is outside the communication zone of the high energy device and a next hop node is within the communication zone of the high energy device.

11. The wireless sensor network according to claim 7, wherein the surrounding wireless sensor node is configured to:
extract the node role and the identifier of the high energy device from the message broadcast by the high energy device, add the node role into the node role queue, and add the identifier of the high energy device into the high energy device role queue, when the high energy device role queue is empty or has one element; and
discard the message broadcast by the high energy device when the high energy device role queue has two elements.

12. The wireless sensor network according to claim 7, wherein the surrounding wireless sensor node is configured to:
sample sensor information and transmit the sensor information to a data gathering node via a shortest route or a tree route in a multi-hop wireless transmission way when the updated node role queue is empty;
sample the sensor information and transmit the sensor information to the high energy device when the element in the updated node role queue is the source node;
enter a dormancy state periodically when the element in the updated node role queue is the forwarding node, and receive the sensor information sent from the source node and transmitted by the high energy device and transmit the sensor information to a next hop node in a working state;
transmit the sensor information to the forwarding node periodically when the element in the updated node role queue is the affected node, in which the surrounding wireless sensor node temporarily stores the sensor information when the forwarding node is in the dormancy state and transmits the sensor information to the forwarding node when the forwarding node is working;
sample the sensor information and transmit the sensor information to a previous high energy device when the element in the updated node role queue is defined to be the source node by the previous high energy device and then defined to be the source node or the affected node by a subsequent high energy device;
enter the dormancy state periodically when the element in the updated node role queue is defined to be the source node by the previous high energy device and then defined to be the forwarding node by the subsequent high energy device, and receive the sensor information from the subsequent high energy device and forward the sensor information to the previous high energy device in the working state;
enter the dormancy state periodically when the element in the updated node role queue is defined to be the forwarding node by the previous high energy device and then defined to be the source node by the subsequent high energy device, and receive the sensor information from the previous high energy device and forward the sensor information to the subsequent high energy device in the working state;
sample the sensor information and transmit the sensor information to the data gathering node via a shortest route or a tree route in a multi-hop wireless transmission way when the element in the updated node role queue is defined to be the forwarding node by the previous high energy device and then defined to be the forwarding node or the affected node by the subsequent energy device;
transmit the sensor information to the subsequent high energy device directly when the element in the updated node role queue is defined to be the affected node by the previous high energy device and then defined to be the source node by the subsequent high energy device; and
transmit the sensor information to the forwarding node periodically when the element in the updated node role queue is defined to be the affected node by the previous high energy device and then defined to be the forwarding node or the affected node by the subsequent high energy device, in which the surrounding wireless sensor node temporarily stores the sensor information when the forwarding node is in the dormancy state and transmits the sensor information to the forwarding node when the forwarding node is working.

13. A system for adjusting behaviors of surrounding wireless sensor nodes in a wireless sensor network, wherein the wireless sensor network comprises a plurality of wireless sensor nodes, each of the plurality of wireless sensor nodes has a node role queue and a high energy device role queue, each of the node role queue and the high energy device role queue is defined to have no more than two elements and initialized to be empty, and the system further comprises at least one high energy device,
the high energy device is configured to compute a node role of each surrounding wireless sensor node and to broadcast a message including the node role of each surrounding wireless sensor node and an identifier of the high energy device, in which the node role is one of a source node, a forwarding node and an affected node, and the surrounding wireless sensor node is configured to receive the message broadcast by the high energy device, to update the node role queue and the high energy device role queue according to the message broadcast by the high energy device, and to adjust a behavior thereof according to the updated node role queue.

14. The system according to claim 13, when a new high energy device appears, the new high energy device is configured to compute a node role of each surrounding wireless sensor node and to broadcast a message including the node role of each surrounding wireless sensor node and an identifier of the new high energy device, and the surrounding wireless sensor node is configured to receive the message broadcast by the new high energy device and to update the node role queue and the high energy device role according to the message broadcast by the new high energy device.

15. The system according to claim 13, wherein when the high energy device quits the system, each of the plurality of surrounding wireless sensor nodes clears the node role defined by the quitting high energy device and the identifier of the quitting high energy device.

16. The system according to claim 13, wherein
the high energy device determines a surrounding wireless sensor node to be a source node when the surrounding wireless sensor node is within a communication zone of the high energy device and a next hop node is still within the communication zone of the high energy device;
the high energy device determines a surrounding wireless sensor node to be a forwarding node when the surrounding wireless sensor node is within the communication zone of the high energy device and a next hop node is outside the communication zone of the high energy device; and
the high energy device determines a surrounding wireless sensor node to be an affected node when the surrounding wireless sensor node is outside the communication zone of the high energy device and a next hop node is within the communication zone of the high energy device.

17. The system according to claim 13, wherein the surrounding wireless sensor node is configured to:
extract the node role and the identifier of the high energy device from the message broadcast by the high energy device, add the node role into the node role queue, and add the identifier of the high energy device into the high energy device role queue, when the high energy device role queue is empty or has one element; and
discard the message broadcast by the high energy device when the high energy device role queue has two elements.

18. The system according to claim 13, wherein the surrounding wireless sensor node is configured to:
sample sensor information and transmit the sensor information to a data gathering node via a shortest route or a tree route in a multi-hop wireless transmission way when the updated node role queue is empty;
sample the sensor information and transmit the sensor information to the high energy device when the element in the updated node role queue is the source node;
enter a dormancy state periodically when the element in the updated node role queue is the forwarding node, and receive the sensor information sent from the source node and transmitted by the high energy device and transmit the sensor information to a next hop node in a working state;
transmit the sensor information to the forwarding node periodically when the element in the updated node role queue is the affected node, in which the surrounding wireless sensor node temporarily stores the sensor information when the forwarding node is in the dormancy state and transmits the sensor information to the forwarding node when the forwarding node is working;
sample the sensor information and transmit the sensor information to a previous high energy device when the element in the updated node role queue is defined to be the source node by the previous high energy device and then defined to be the source node or the affected node by a subsequent high energy device;
enter the dormancy state periodically when the element in the updated node role queue is defined to be the source node by the previous high energy device and then defined to be the forwarding node by the subsequent high energy device, and receive the sensor information from the subsequent high energy device and forward the sensor information to the previous high energy device in the working state;
enter the dormancy state periodically when the element in the updated node role queue is defined to be the forwarding node by the previous high energy device and then defined to be the source node by the subsequent high energy device, and receive the sensor information from the previous high energy device and forward the sensor information to the subsequent high energy device in the working state;
sample the sensor information and transmit the sensor information to the data gathering node via a shortest route or a tree route in a multi-hop wireless transmission way when the element in the updated node role queue is defined to be the forwarding node by the previous high energy device and then defined to be the forwarding node or the affected node by the subsequent energy device;
transmit the sensor information to the subsequent high energy device directly when the element in the updated node role queue is defined to be the affected node by the previous high energy device and then defined to be the source node by the subsequent high energy device; and
transmit the sensor information to the forwarding node periodically when the element in the updated node role queue is defined to be the affected node by the previous high energy device and then defined to be the forwarding node or the affected node by the subsequent high energy device, in which the surrounding wireless sensor node temporarily stores the sensor information when the forwarding node is in the dormancy state and transmits the sensor information to the forwarding node when the forwarding node is working.

* * * * *